G. F. LINE.
CONTROL FOR MOTOR VEHICLES.
APPLICATION FILED JUNE 28, 1918.
1,365,112.
Patented Jan. 11, 1921.
2 SHEETS—SHEET 1.
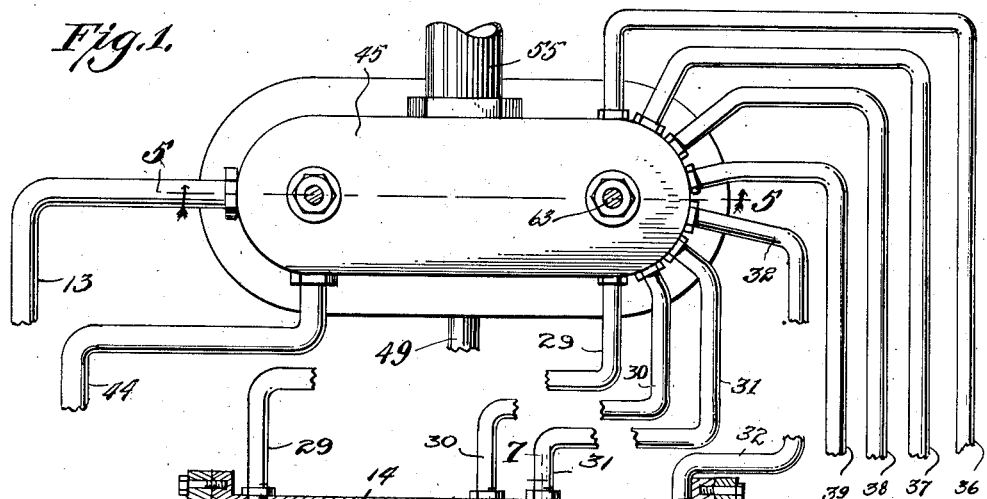
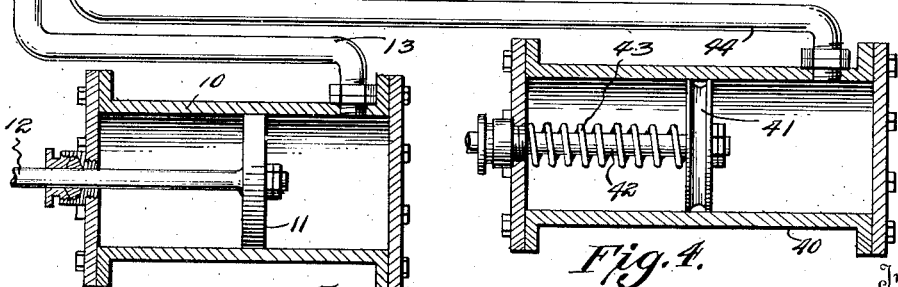
Inventor
G. F. Line

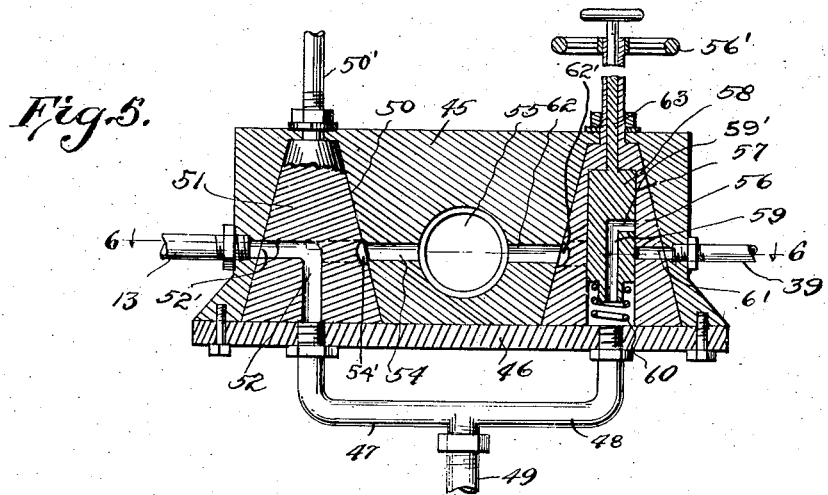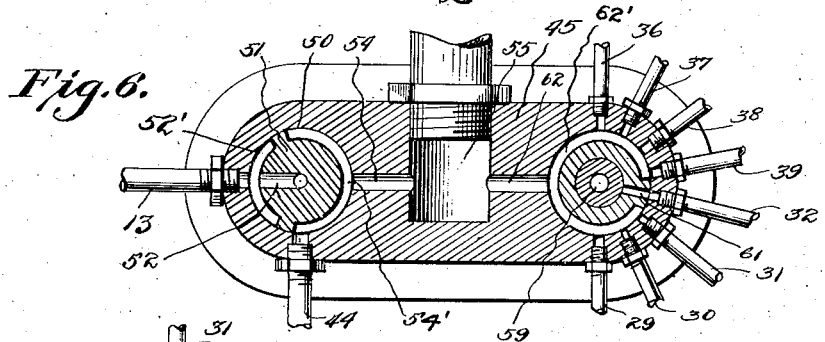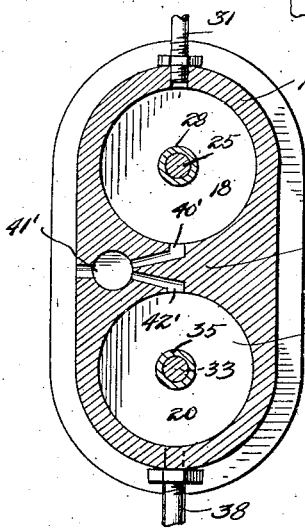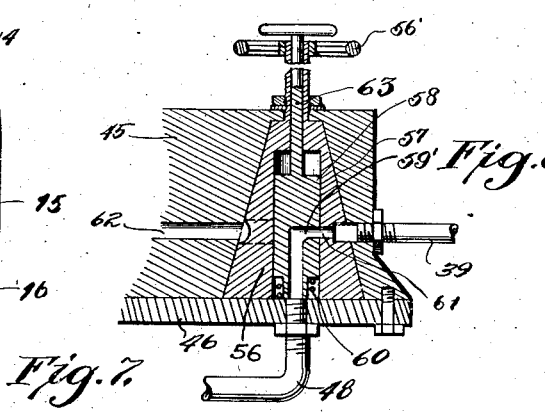

UNITED STATES PATENT OFFICE.

GEORGE F. LINE, OF MUNCIE, INDIANA.

CONTROL FOR MOTOR-VEHICLES.

1,365,112.   Specification of Letters Patent.   Patented Jan. 11, 1921.

Application filed June 28, 1918. Serial No. 242,405.

*To all whom it may concern:*

Be it known that I, GEORGE F. LINE, a citizen of the United States, residing at Muncie, in the county of Delaware, State of Indiana, have invented certain new and useful Improvements in Controls for Motor-Vehicles; and I do hereby declare the following to be a full, clear, and exact description of the invention, such as will enable others skilled in the art to which it appertains to make and use the same.

This invention is an improvement in motor vehicles and has particular reference to an air pressure controlled mechanism for operating the clutch, transmission and brakes of a vehicle.

An object of the invention is the provision of an improved mechanism controlled from the driver's seat of a vehicle to operate the clutch, shift the gears of the transmission to obtain various speeds and actuate the brake by air pressure derived from a source of supply.

The inventive idea involved is capable of receiving a variety of mechanical expressions, one of which, for the purpose of illustrating the invention, is shown in the accompanying drawings wherein:—

Figure 1 is a top plan view partly in section, of the means controlling the supply of air pressure.

Fig. 2 is a vertical longitudinal section through the transmission gear operating mechanism.

Fig. 3 is a similar view through the clutch operating mechanism.

Fig. 4 is a similar view through the brake operating mechanism.

Fig. 5 is a section on the line 5—5 of Fig. 1.

Fig. 6 is a section on the line 6—6 of Fig. 5.

Fig. 7 is a section on the line 7—7 of Fig. 2.

Fig. 8 is a fragmentary section similar to Fig. 5 showing the valve in its operated position.

The invention is designed to be used in connection with the clutch, gearing transmission, and brake of a motor vehicle for operating said parts as desired and the clutch preferably has associated therewith a cylinder 10 in which is slidably mounted a piston 11 connected to the rod 12 at one end thereof, the other end of said rod being secured, in any desired manner, not shown, to the clutch so that when the piston 11 is actuated in one direction the clutch will be thrown into operation. Extending from the wall of the cylinder 10 is one end of an air feed pipe 13 through which air pressure is supplied into the interior of cylinder 10 on one side of the piston 11 so as to actuate the same in the desired direction and when this pressure is released, in a manner to be later described, the piston 11 will return to its normal position under the action of the clutch spring as is usual.

The mechanism employed to actuate the different gears of the transmission (not shown) preferably comprises a casing 14 having the horizontal and vertical partitions 15 and 16 respectively, which divide the interior of the casing into a series of cylinders 17, 18, 19 and 20 having slidable therein the pistons 21, 22, 23 and 24. The pistons 21 and 22 are connected by a rod 25 slidable through a packing gland 26 in one end of the casing 14 and also through the vertical partition 16, and said rod has mounted thereon between the two pistons the sleeves 27 and 28 which limit the movements of the pistons 21 and 22 by engagement with the vertical partitions 16. The rod 25 of the pistons is connected to the mechanism (not shown) for shifting the low speed and reverse gears of the transmission so that when the rod 25 is operated to the left, see Fig. 2, the low gear speed will be thrown into operation and when actuated to the right, as shown in said figure, the reverse gear will be operated. Air pressure is employed to actuate the pistons 21 and 22 and for this purpose the casing 14 has mounted therein and communicating with the cylinder 17 the ends of pipes 29 and 30, the former being employed to supply air to the cylinder on the left of the active piston 21 to move the same to the right in order to throw the reverse gear into operation while the pipe 30 is adapted to supply air pressure to the cylinder on the right of the piston 21 in order to move the same to the left and throw the low speed gear into operation. The neutral piston 22 in the cylinder 18 is employed to throw the reverse and low speed gears out of operation and has communicating therewith the pipes 31 and 32, the former supplying air to the left of the piston 22 to move the same to the right while the latter pipe feeds the air into the cylinder to move the piston 22 to the left to throw the reverse gear out of operation. The pistons 23 and 24 are similarly connected by a rod 33 extending through the end of the casing 14 in the same manner as the rod 25 and the movements of said pistons are also limited by the sleeves 34 and 35. The piston is adapted to be moved to the left in order to throw the intermediate speed gear into operation and to this end the cylinder 19 has communication with a pipe 36. In order to move the active piston 23 to the right to produce the high speed, the cylinder 19 also has mounted therein an end of the air feed pipe 37 so that when the air is injected into the cylinder upon the left of the piston 23 the same will be moved toward the right end of the cylinder until the sleeve 34 contacts with the partition 16. To throw the intermediate and high speed gears out of operation the cylinder 20 has communicating therewith on opposite sides of the neutral piston 24 therein the pipes 38 and 39 which feed air pressure into the cylinder on the left and right, respectively, of said piston 24 to move the same in the different directions.

In throwing the low and reverse gears out of operation by actuating the piston 22 to the right or left, it is necessary that said piston assume its neutral position, shown in Fig. 2, and to this end, the horizontal partition 15 has, in the upper surface thereof, the neutral exhaust ports 40' between which the piston 22 will rest; and as the same is moved in either direction and passes over the exhaust ports, it will be apparent that the air injected into the cylinder 18 will pass out through the ports and into the main exhaust passage 41'. Similarly, the chamber 20 is provided with the neutral exhaust ports 42' which communicate with the main exhaust 41' to permit of the escape of air pressure in said chamber when the piston 24 is moved to its neutral position.

The brake mechanism of the vehicle has associated therewith the cylinder 40 in which is slidably mounted the piston 41 having the usual rod 42 extending through one end of the cylinder and connected to the brake mechanism so that when the piston 41 is operated in one direction the brake will be actuated and in order that the piston may be returned to its normal position the rod is encircled by a coil spring 43 which returns the piston when air is exhausted.

The means for directing air pressure to the several pipes mentioned above and thence to the different cylinders, is illustrated particularly in Figs. 5, 6, 7 and 8. This pressure distributing mechanism comprises a valve casing 45 in one end portion of which is a frusto-conical valve seat 50 in which is fitted a correspondingly shaped valve or plug 51 having an upwardly directed stem 50' for manipulating it. Through the base plate 46 of the valve casing are engaged the branch arms 47 and 48 of a main air pressure supply pipe 49 which may be connected with any suitable source of air pressure not shown.

Opening axially from the base of the valve 51 and in communication with the branch pipe 47, is the lower end of an air passage 52 whose upper end extends laterally and communicates with an arcuate channel 52' extending around the periphery of the valve for a little over 90° as seen in Fig. 6. Directly opposite this channel is another channel 54' extending around the periphery of the valve for a little over 180°. Both channels are seen in Fig. 6. The pipe 13 from the clutch cylinder 10 opens into the valve seat 50 at one side, and the pipe 44 from the brake cylinder 40 opens into said cylinder about 90° from the pipe 13, as also seen in Fig. 6, while an exhaust port 54 directly opposite the pipe 13 leads from the seat into the main exhaust 55.

With this construction it will be seen that the valve 51 may be set to admit air to the clutch cylinder, or the brake cylinder, or to both; or the valve may be turned so that the exhaust channel 54' will place the port 54 in communication with the pipe 13, the pipe 44, or both. Therefore the operator has the fullest control through the stem 50' and may set this valve to actuate the piston 11, or the piston 41, or both, or to release the pressure from behind either or both, at will.

For the purpose of supplying air pressure to the eight pipes communicating with the different cylinders in the casing 14 the valve casing 45 also has mounted therein a valve 56 somewhat similar to the valve 51 and rotated by the hand wheel 56' from the driver's seat of the vehicle. The valve 56 is provided with a central longitudinal opening 57 in which is mounted a plug 58 having an angular passage therein a portion 59 of which extends longitudinally along the axis of the plug and the other portion 59' communicates with the periphery thereof, and the outer end of the last named portion is normally closed by the wall of the opening 57 whereby air pressure entering the longitudinal portion 59 of the passage from the branch pipe 48 is prevented from escaping. The plug 58 is held in its normal raised position by means of a coil spring 60 interposed between the lower end of the plug and the base plate 46 and exerting an upward pressure against the former. The wall of the valve 56 is provided with a radial passage 61 which is adapted to establish communication between the end of any one of the several pipes leading to the corresponding end of the casing 45 said valve is also provided in its periphery with an arcuate exhaust channel 62' leading almost entirely around the same, but stopping short of the passage 61 as seen in Fig. 6, this channel being in constant communication with a duct 62 which leads to the main exhaust 55 so that the different cylinders of the casing 14 are normally free from pressure. In order to feed pressure into any one of the pipes leading to the cylinders in the casing 14, the valve 56 is first rotated by its hand wheel 56' to set the radial passage 61 in line with the pipe selected, at which time all the other pipes would open into the exhaust channel 62' as shown and there is therefore a free outlet for air from every part of the casing 14 excepting that connected with the pipe selected. The plug 58 is now momentarily depressed by a knob 58' at its upper end, so that the radial portion 59' of its passage communicates with the passage 61 and the latter with the pipe selected, and air under pressure flows into the casing 14. Let us assume that air enters through the pipe 38 at the left side of the piston 24 within the neutral cylinder 20. This piston is moved to the right until it reaches the neutral position shown in Fig. 2, when both neutral exhaust ports 42' are open and even if the operator should hold the plug depressed, the further admission of air will have no effect. The transmission is therefore moved to a position between intermediate and high. Assuming that the operator desires to set the transmission at high, he now turns the valve 56 with its passage 61 registering with the pipe 37, air flows into the active cylinder 19 at the left of the piston 23, and the latter moves to the right which it can do, because the pipe 36 now relieves the pressure to the right of this piston and the pipe 39 relieves pressure to the right of the neutral piston 24. The parts therefore move to the right until the sleeve 34 strikes the partition 16, at which time the transmission is set on high so that if the operator should hold the plug depressed no harm is done. If the parts were moved in the other direction to set the transmission on intermediate, the sleeve 35 would strike the partition at the proper time. Whichever way the parts are moved, the rod carries the piston 24 and of course closes one neutral exhaust 42'; but this exhaust is on that side of the neutral piston which must receive pressure next through pipe 38 or 39 to restore the parts to their neutral position.

Thus it will be seen that the driver has complete control over the three important mechanisms in his motor vehicle. He can apply the brake gently and for service purposes, he can both open the clutch and apply the brake and by leaving the valve 51 at that position he can hold the brake applied to bring his machine to a full stop, he then has both hands free if desired, he can turn the hand wheel 56' with one hand and depress the knob 58' with a finger of that hand so that the other hand may yet be applied to the handle of the stem 50' if preferred, and he can now shift his transmission from any active position to neutral, and then immediately to any other active position selected. The several controls are actuated by fluid pressure herein referred to as air pressure which is preferred, although I would not be limited in that particular.

What is claimed is:—

1. In a motor vehicle having a transmission gearing; a casing having vertical and horizontal partitions therein for dividing the same into a plurality of cylinders, a piston operable in each of said cylinders and adapted to be connected to the transmission gearing for actuating the same, a pair of air feed pipes communicating with each cylinder on opposite sides of the piston therein whereby to move the same in opposite directions, a main supply pipe adapted for communication with all of the pipes leading into the different cylinders, and a valve interposed between the main supply pipe and the first named pipes for controlling the admission of air pressure from the main supply pipe thereto and also permitting of the exhaust of the air pressure from said first named pipes.

2. In a device of the class described, a casing having vertical and horizontal partitions therein for dividing the same into a plurality of cylinders, a piston operable in each of said cylinders and adapted to be connected with work to be performed, a pair of air feed pipes communicating with each cylinder on opposite sides of the piston therein whereby to move the same in opposite directions, a main supply pipe adapted for communication with all of the pipes leading into the different cylinders, a valve interposed between said main supply pipe and the first named pipes for controlling the admission of air pressure thereto and normally in a position to shut off said air pressure, and a plug rotatable in said valve and adjustable longitudinally thereof to establish communication between said main supply pipe and any one of the first named pipes whereby to feed air pressure into the latter.

3. In a fluid pressure control for a motor vehicle having clutch, brake, and transmission mechanisms, the combination with a cylinder having a piston for connection with the clutch, a cylinder having a piston for connection with the brake, and a cylinder having a piston for connection with the transmission mechanism; of a valve casing containing two seats and an interposed exhaust connected with both, a pipe leading from a source of compressed fluid and branched to both seats, pipes opening into one seat and connected respectively with the clutch and brake cylinders, pipes opening into the other seat and connected respectively with the opposite ends of the cylinder in the transmission control casing, and independently operable valves in said seats each having a passage in constant communication with one branch of the fluid supply pipe and adapted to be set selectively in communication with certain of the pipes, and each also having a channel adapted to simultaneously connect the remaining pipes with the exhaust.

4. In a fluid pressure control for a motor vehicle having clutch, brake, and transmission mechanisms, the combination with a cylinder having a piston for connection with a clutch, a cylinder having a piston for connection with a brake, and a casing having two cylinders having pistons adapted for operative connection respectively with different gears in a transmission mechanism; of a valve casing containing two seats and an interposed exhaust connected with both, a compressed fluid supply pipe branched to both seats, pipes opening into one seat and connected respectively with the clutch and brake cylinders, pipes opening into the other seat and connected respectively with the opposite ends of the several cylinders and independently operable valves in said seats each having a passage in constant communication with one branch of the fluid supply pipe and adapted to be set selectively in communication with certain of the remaining pipes, and each also having a channel adapted to connect the remainder of said pipes with the exhaust.

5. In a fluid pressure control for a transmission mechanism, the combination with a casing containing two cylinders end to end, a piston in each, and a common piston rod adapted to be connected with said mechanism, one cylinder having neutral exhausts at both sides of the intermediate position of its piston; of pipes leading from both ends of both cylinders, a distributing valve through the wall of whose casing such pipes open, said wall also having an exhaust duct and an inlet connected with a compressed fluid supply, the valve within said casing having a passage in constant communication with said inlet and deflected radially and adapted to be set in communication with the selected pipe, and the valve also having an exhaust channel adapted at this time to connect all other pipes with said duct.

6. In a fluid pressure control for a transmission mechanism, the combination with a casing having two cylinders end to end separated by a partition, a rod sliding through said partition and the head of one cylinder and adapted to be connected with said transmission, and pistons fast on the rod within the cylinders and having sleeves extending toward the partition; of pipes connected with both ends of both cylinders and leading to a control valve, the latter connected with a fluid supply and an exhaust and adapted to be set to control the action of the pistons, as described.

7. A control for transmission mechanisms, comprising a casing containing longitudinal and transverse partitions dividing it into two pairs of cylinders end to end, a piston in each of the four cylinders, piston rods for connection respectively with elements of the transmission mechanism and each carrying the two pistons of a pair, pipes leading from both ends of all cylinders, and a valve for controlling the admission of compressed fluid to the selected pipe and the connection of the remaining pipes with an exhaust.

In testimony whereof, I affix my signature, in the presence of two witnesses.

GEORGE F. LINE.

Witnesses:
RUBY DITZLER,
LEO P. HARRINGTON.